(12) United States Patent
Choo et al.

(10) Patent No.: US 7,951,527 B2
(45) Date of Patent: May 31, 2011

(54) METHOD OF FORMING AN INTEGRATED OPTICAL POLARIZATION GRID ON AN LCD SUBSTRATE AND LIQUID CRYSTAL DISPLAY MANUFACTURED TO INCLUDE THE GRID

(75) Inventors: Dae Ho Choo, Seongnam-Si (KR); Yeon Hee Yu, Suwon-Si (KR); Hong Gyun Kim, Cheonan-Si (KR)

(73) Assignee: Samsung Electronics Co., Ltd. (KR)

( * ) Notice: Subject to any disclaimer, the term of this patent is extended or adjusted under 35 U.S.C. 154(b) by 612 days.

(21) Appl. No.: 11/923,978

(22) Filed: Oct. 25, 2007

(65) Prior Publication Data

US 2008/0100779 A1   May 1, 2008

(30) Foreign Application Priority Data

Oct. 30, 2006   (KR) .................. 10-2006-0105691

(51) Int. Cl.
 *G02B 5/30* (2006.01)
 *G03F 7/36* (2006.01)
(52) U.S. Cl. ............. 430/321; 349/96; 216/24; 359/486
(58) Field of Classification Search .................. 349/96; 359/486; 430/321; 216/11, 23, 24, 39; 264/1.31; 427/163.1
See application file for complete search history.

(56) References Cited

U.S. PATENT DOCUMENTS

| | | | |
|---|---|---|---|
| 5,986,730 A * | 11/1999 | Hansen et al. | 349/96 |
| 6,122,103 A | 9/2000 | Perkins et al. | |
| 6,813,077 B2 | 11/2004 | Borrelli et al. | |
| 6,987,547 B2 | 1/2006 | Yang et al. | |
| 2005/0046943 A1 | 3/2005 | Suganuma | |
| 2006/0056024 A1 * | 3/2006 | Ahn et al. | 359/486 |
| 2007/0076143 A1 * | 4/2007 | Palk et al. | 349/96 |

FOREIGN PATENT DOCUMENTS

| | | |
|---|---|---|
| JP | 5-88141 | 4/1993 |
| JP | 5-88151 | 4/1993 |
| JP | 2002-0021129 | 12/2000 |
| JP | 2005-37900 | 2/2005 |
| JP | 2005-70456 | 3/2005 |
| KR | 2004-0106982 | 12/2004 |
| KR | 2005-0038243 | 4/2005 |
| KR | 2005-0072877 | 7/2005 |
| KR | 2006-0030811 | 4/2006 |

* cited by examiner

*Primary Examiner* — David Nelms
*Assistant Examiner* — Tai Duong
(74) *Attorney, Agent, or Firm* — Innovation Counsel LLP (57) ABSTRACT

A method of forming a wire grid polarizing pattern across the relatively large surface area of a display substrate includes using a nano imprint lithograph process wherein wire grid polarizing patterns are formed by bonding a stamp having a stamping area substantially smaller than that of the substrate with successive reticle areas of the substrate, where the substrate has a photosensitive film deposited thereon and where the stamping is such that recesses having a predetermined depth are formed in the photosensitive film, and then filling the recesses with an insulating film and etching it using the insulating film as a mask. Since mechanical misalignment margin is acceptable from one reticle area to the next, a wire grid polarizing pattern with a uniform line width and spacings in each reticle area can be formed on a substrate having a large area.

8 Claims, 7 Drawing Sheets

METHOD OF FORMING AN INTEGRATED OPTICAL POLARIZATION GRID ON AN LCD SUBSTRATE AND LIQUID CRYSTAL DISPLAY MANUFACTURED TO INCLUDE THE GRID

CROSS-REFERENCE TO RELATED APPLICATIONS

This application claims priority to and the benefit of Korean Patent Application No. 10-2006-0105691, filed Oct. 30, 2006, the disclosure of which is incorporated herein by reference in its entirety.

BACKGROUND

1. Field of Invention

The present disclosure of invention relates to a method of forming an optical polarizing grid and to a liquid crystal display having the same, and particularly to a method of integrally forming a metallic polarizing grid by means of applying a nano-scale imprint lithography process to a substrate that has a relatively large surface area such as in the case of liquid crystal display panels.

2. Description of Related Art

A liquid crystal display (LCD) is typically composed of a thin film transistors (TFT) supporting substrate having pixel electrodes formed thereon, and a color filters supporting substrate having a common electrode formed thereon. The typical LCD also has a liquid crystal material layer inserted in between the TFT-supporting and filters-supporting substrates. A liquid crystal display can display images by applying appropriate voltages between the pixel electrodes and the common electrode at respective pixel areas so as to thereby rearrange the orientations liquid crystal molecules in between and thus adjust the amount of light transmitted at the pixel area and through the three major layers of the LCD (the TFT-supporting, the liquid crystal, and the filters-supporting layers). In backlit types of liquid crystal displays a backlighting unit is typically provided to the rear of the three major layers of the liquid crystal display for providing a source of polarized light to irradiate through the three layers.

Light irradiated from the backlighting unit is typically given specific polarization characteristics by passing the light through a polarizer before it enters the LCD's three major layers. Liquid crystal displays are able to display images by using a voltage modulated optical anisotropy of the liquid crystal molecules in combination with the light polarizing effects provided by the polarizer (or more correctly that provided by two polarizers; one at the bottom of the three layers and one differently oriented at the top).

Metallic wire grid polarizers have been developed in recent years for use as polarizers in liquid crystal display panels. Wire grid polarizers may be formed by forming on a substrate or a thin film, a striped pattern of parallel lines of metal or another reflective substance with line widths and inter-line spacings which are smaller than the wavelengths of red, green, and blue portions in the visible light that is perceptible by human. When unpolarized white light enters such a wire grid pattern from a backlighting unit for example, polarization occurs because such light generally travels with its wave oscillations extending perpendicular to the traveling direction. Only the light entering with its oscillations substantially parallel with the longitudinal direction of the spaces between wire grid polarizing patterns manages to initially pass through the grid.

When a wire grid polarizer is formed of a metallic material such as aluminum (Al) that has a high optical reflectance, light entering from the backlighting unit and with its oscillations roughly perpendicular to the longitudinal direction of spaces between wire grid polarizing patterns cannot pass through the spaces and instead reflects back to the backlighting unit. If a phase-altering transmission layer (modulation layer) is provided having different refractivity and being disposed between the wire grid polarizer and the backlighting source, then the phase of the back reflected light is changed as it passes into the phase-altering transmission layer and part of that light refracts back up to try and re-enter the wire grid polarizer at a new polarization angle. After one or more tries it succeeds and thus an additional passage of polarized light occurs as a result of such phase-changed reflection or refraction.

Recycling of light as described above may be continuously carried out, so that the wire grid polarizer has a similar effect as DBEFs (Dual Brightness Enhancement Film) that improves the transmittance of polarized light. Accordingly, because recycling of light can be embodied using a simple modulation layer structure instead of using the prior-art, but complicated DBEFs, an inexpensive polarizer having high transmittance can be achieved.

However, because in this application a metallic reflective film typically needs to be formed by patterning a metallic layer at a nano scale of about 50 nm to 200 nm, such a wire grid polarizer cannot be reliably manufactured if the metal patterning process does not provide sufficient fine resolution and repeated ability during mass production. The called for, small dimensions suggest that one should provide a photosensitive layer atop a reflective layer, that one should photolithographically pattern the entire layer at the nano scale and that one should etch the metallic reflective film by using the patterned photosensitive layer as an etch mask.

Recently, a nano imprint lithography process has been made available that patterns a photosensitive film for subsequent development by press-bonding a small stamp having a desired pattern engraved in a bonded-part thereof and by press-applying the stamp to the photosensitive film. In such a nano imprint lithography process, mechanical accuracy is very important because a pattern is formed by mechanically press-bonding the stamp to the photosensitive film. As for small parts, such as or wafers for semiconductor integrated circuits (i.e., i.e. of diameter less than 12 inches), mechanical accuracy across long distances (greater than about 300 mm) is not very important. However, in the case of Liquid Crystal Displays (LCDs), process yield appears to depend considerably on long-distance mechanical accuracy because the substrates have relatively large surface areas (i.e., much greater than 600 mm×720 mm) which correspond to the whole of the liquid crystal display panel that is viewed by users. Therefore, in order to form a nano-scaled photosensitive pattern on a substrate having such a large area, it appears that a very accurate process needs to be developed for dealing with dependence on mechanical accuracy over long distances. In other words, although the existing nano imprint lithography processes might be effectively used for small-sized substrates such as conventional IC chips or conventional wafers, it does appear that the same processes can be applied for forming wire grid polarizers across substrates having a much larger area, because the mass production yield will decrease significantly and uniformity in line widths and inter-line spaces of the wire grid polarizing pattern will likely decrease if one attempts to roll a stamp across such a large surface area. In addition, it appears that polarizing characteristics of the polarizer will also be decreased by lack of uniformity in a wire grid polarizing pattern produced by such conventional application of the nano-imprint technique.

SUMMARY

The present disclosure of invention provides a method of manufacturing a wire grid polarizing pattern that can improve characteristics of the polarizing pattern by reducing variations in line widths and inter-line spaces of the wire grid polarizing pattern and allowing the method to be applied across relatively large substrates having surface areas substantially larger than 300 mm by 300 mm.

A method of manufacturing a wire grid polarizing pattern according to one embodiment includes: forming a reflective layer on a substrate; forming a UV-hardenable photosensitive film above the reflective layer; forming recess patterns having a predetermined space and depth at predetermined regions on the photosensitive film; filling the recesses with an etch masking material; and etching the photosensitive film and the reflective layer by using the etch masking material in the recesses as an etch mask and removing the exposed photosensitive film.

The reflective layer may be formed of a reflective substance such as a metal including aluminum and/or alloys thereof.

The method may further include forming an anti-reflective film between the reflective layer and the photosensitive film.

The recesses may be formed by bonding an imprinting stamp having a predetermined engraved pattern with the photosensitive film and thereafter hardening the photosensitive film.

The recesses may be formed to have a depth in the range of 10 to 50% in respect to the thickness of the photosensitive film.

The insulating film filled in the recesses may be formed by forming an insulating film on the entire upper surface to fill the recesses and performing a blanket etch back over the entire insulating film to a depth that exposes the photosensitive film.

The photosensitive film may be etched by an oxygen containing plasma and the reflective layer may be etched by mixed plasma fed by input gases including $BCl_3$, $Cl_2$, $SF_6$, and $O_2$.

A liquid crystal display according to an embodiment of the invention includes: an upper substrate and a lower substrate each having a predetermined functional layer (i.e., pixel-electrodes and common electrode), and a liquid crystal layer interposed between the substrates; and a wire grid polarizing pattern with predetermined line width and interline-spacings integrally formed on at least one of the upper and lower substrates; in which the wire grid polarizing pattern is formed by adhering a reflective layer to the substrate and providing a hardenable photosensitive film above the reflective layer, forming recesses having a predetermined depth in the photosensitive film and filling the recesses with an insulating film, and then etching the reflective layer by using the recess-filling portions of the insulating film as an etch mask.

A liquid crystal display according to another embodiment includes: a thin film transistors supporting substrate that includes gate lines extending in one direction on a first substrate, data lines extending perpendicularly to the gate lines to thereby define pixel areas corresponding to the crossings, and pixel electrodes formed at pixel areas defined by the gate lines and data lines; and a color filters supporting substrate that includes black matrixes formed corresponding to regions other than the pixel areas on a second substrate, color filters corresponding to the pixel areas, and a common electrode; in which at least any one of the first and second substrates includes a wire grid polarizing pattern with a predetermined line width and space that is formed by forming a reflective layer and a photosensitive film, forming recesses having a predetermined depth on the photosensitive film and filling the recesses with an insulating film, and then etching the reflective layer by using the insulating film as a mask.

BRIEF DESCRIPTION OF THE DRAWINGS

The above and other features of the present disclosure of invention will become clearer from the below detailed description taken in combination with reference to the attached drawings in which.

DETAILED DESCRIPTION

As for the accompanying drawings, illustrated thicknesses are not necessarily to scale and some were expanded to more clearly show the several layers and regions.

Same reference numerals are generally used to designate alike or same parts. It will be understood that when an element, such as a layer, film, region, plate, is referred to as being "over" or "on" another element, it not only may be "directly over" or "directly on", but also it may have another element interposed in between unless it is said to be directly on.

FIGS. 1A to 1F are cross-sectional views showing sequential processing steps that illustrate a method of forming a wire grid polarizing pattern according to an embodiment of the present disclosure.

Figure 1A:
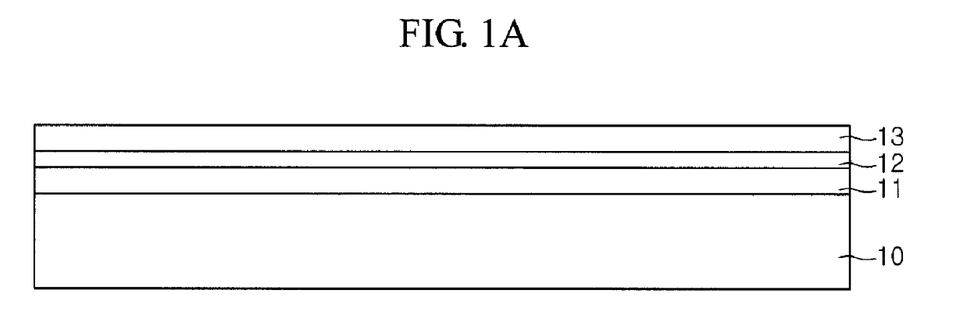
FIGS. 1A to 1F are cross-sectional views showing sequential steps in one method of manufacturing a wire grid polarizing pattern according to the present disclosure.

Referring to FIG. 1A, a reflective layer 11, an anti-reflective film 12, and a UV-hardenable and/or heat-hardenable soft film such as a photosensitive polymer film 13 are sequentially formed on a transparent substrate 10 as shown. The substrate 10 may be used for defining a thin film transistors supporting substrate or a color filters supporting substrate of a liquid crystal display and it typically includes a wide area glass substrate having dimensions substantially larger than 600 mm by 720 mm. In other words, the substrate 10 may be a glass substrate for a thin film transistor supporting substrate or a color filter supporting substrate, or another transparent base substrate to be used for a relatively large display panel. On the other hand, in order to form the wire grid polarizing pattern, the reflective layer 11 is composed of an optically reflecting substance (i.e., aluminum or an alloy thereof), for example, to a thickness of about 150 to 200 nm of reflective metal and/or another reflecting substance deposited on the substrate by DC or RF sputtering depending on the type(s) of reflecting substance(s) used. Further, the anti-reflective film 12 may be formed by spin coating and/or otherwise coating an appropriate antireflective material (ARC material) to a thickness of about 50 to 70 nm on or over the reflective layer. In one embodiment, the thickness and composition of the anti-reflective film 12 is selected for interfering with back reflection of a predetermined UV light source so that UV light radiated toward the UV-hardenable film 13 does not reflect back in a non-uniform way from the reflecting layer. Because the desired wire grid polarizing pattern has a nano-scaled line width, during manufacture the anti-reflective film 12 is used as an ARC layer (an anti-reflective coating layer) for preventing non-uniform UV distribution and exposure or a nonuniform hardening resolution due to non-uniform reflection of the UV radiation by the reflective layer 11 during the exposure process for hardening the photosensitive film 13 in the nano imprint lithography process. The photosensitive film 13 is formed of a PR substance that can be hardened (cured so as to retain a mechanical imprint) by exposure for example to UV light and/or heat where the PR substance (i.e., a polymerizable organic substance) is formed to a thickness of about 150 to 200 nm by spin coating or another coating method.

Figure 1B:
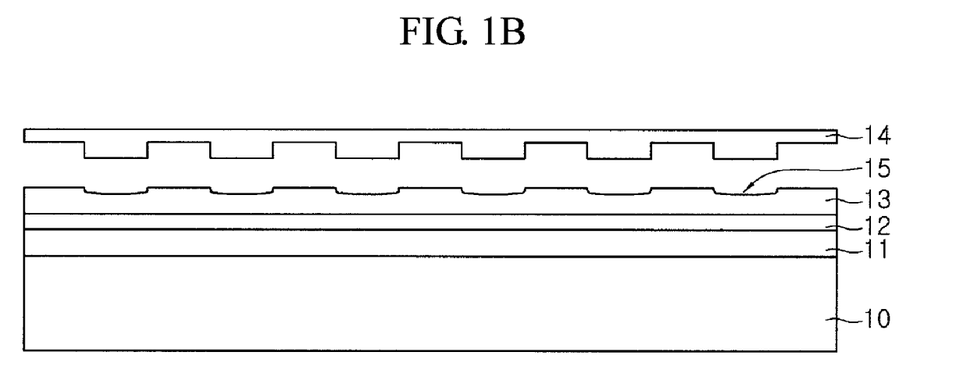

Referring to FIG. 1B, the combination of the substrate 10 and the sequentially formed reflective layer 11, anti-reflective film (ARC) 12, and photosensitive film 13 is loaded into a nano imprinting lithography device that has stepper capabilities. The substrate 10 and a predefined stamp 14 having an engraved copy of the desired wire grid polarizing pattern formed thereon are engaged with one another to thereby imprint the wire grid polarizing pattern at desired positions of the substrate. In one embodiment, the stamp 14 is substantially transparent to UV light of the wavelength used in the hardening process. The stamp 14 and substrate 10 are moved relative to one another and temporarily bonded together in a pixel area so as to form recesses 15 having a predetermined depth in the photosensitive film 13. Although it is preferable in one embodiment to form the recesses to a depth in the range of about 10 to 50% of the thickness of the photosensitive 13, the recesses 15 in one example have a depth of at least about 50 nm. This minimum depth value is used because if the recesses 15 are shallower than that, an insulating film that will next be formed to fill the recesses may not develop projections of sufficient thickness to ensure their functioning as etch masks in yet a subsequent step (transition from FIG. 1D to 1E). On the contrary, if the recesses 15 are made too deep, an undesirably large aspect ratio may develop and make it is difficult to precisely regulate the line width and space of the wire grid polarizing pattern during the subsequent, masked etch process. While the stamp 14 and photosensitive film 13 are bonded together, the photosensitive film 13 may be hardened by use of UV light and/or heat curing where the UV radiation is transmitted through the stamp 14 and into the underlying PR layer 13. This fixes the pattern of the stamp as a hardened imprint into the cured reticle area of the PR layer 13 of FIG. 1B.

Figure 1C:
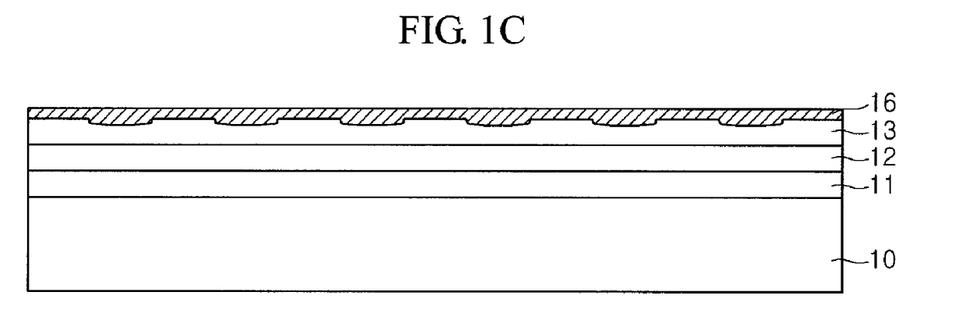

Referring to FIG. 1C, after the photosensitive film 13 that has the recesses 15 imprinted in it is hardened, the photosensitive film 13 and the stamp 14 are separated. A recess-filling etch-stop film 16 is then formed across the entire photosensitive film 13 so that it uniformly fills the recesses 15. The etch-stop film 16 may be formed by depositing a chemically distinguishable material from that of the PR layer 13 such as for example forming a hard mask layer comprising an oxide film that is spin coated onto the imprinted and hardened PR layer 13 where the deposited etch-stop film 16 has a predetermined thickness, for example of about 5 nm as measured from the bottom surfaces of the recesses 15 to the top of the insulating film 16. For example, when it is intended to from an oxide film for the insulating film 16, in one embodiment the oxide film is formed by forming an SOG (Spin On Glass) film and then baking it.

Figure 1D:
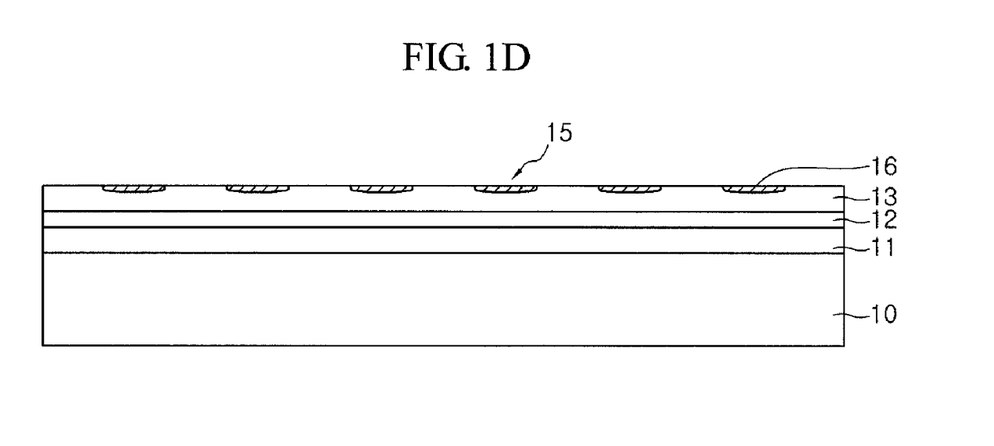

Referring to FIG. 1D, the substrate 10 with the insulating film 16 is unloaded out of the nano imprint lithography device and loaded into a dry etching device. In one embodiment, the insulating film 16 is etched back over its entire surface to an appropriate depth by using a dry etch plasma having an appropriate mix of one or more of the following input gases: $CF_4$, $CHF_3$ and/or $SF_6$ so as to fully expose those portions of the photosensitive film 13 that were not substantially imprinted by the imprinting stamp 14 so as to have one of recesses 15.

Figure 1E:
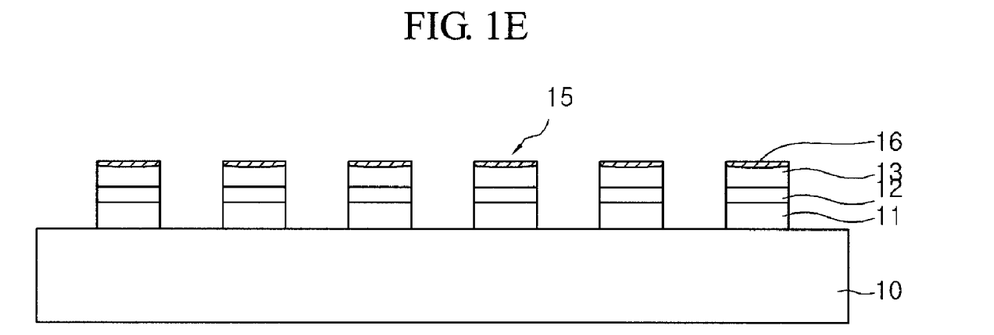

Referring to FIG. 1E, the photosensitive film 13 and the anti-reflective film 12 are etched by an approximate oxide-blocked plasma in the above dry etching device or in another etching device connected to the above dry etching device which is selected in consideration of productivity. In other words, the photosensitive film 13 exposed due to the blanket etch back of the insulating film is now etched away and corresponding portions of the anti-reflective film 12 are also etched away while using the remaining portions of the insulating film 16 as a hard mask. Desired portions of the reflective layer 11 are exposed accordingly for subsequent removal. The exposed portions of the reflective layer 11 are then etched away in one embodiment with the use of a mixed plasma formed of the following feed gases: $Bl_3$, $Cl_2$, $SF_6$, and $O_2$.

Figure 1F:
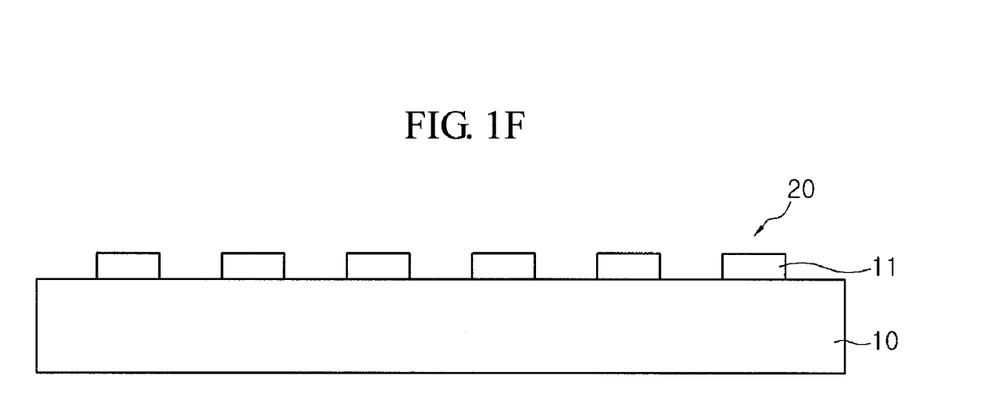

Referring to FIG. 1F, the substrate 10 is unloaded out of the dry etching device and loaded into an ashing device. Anti-reflective film 12 remaining on the reflective layer 11, the photosensitive film 13, and the insulating film 16 are removed by an oxygen containing plasma in the ashing device. As a result, a wire grid polarizing pattern 20 of desired pitch and line widths is integrally formed on the transparent substrate 10.

Since a wire grid polarizing pattern formed as described above is recessed on the photosensitive film only to a predetermined depth by a stamp, a process margin can be improved. Further, since lower layers are etched using an insulating film that fills recesses as a mask, the lower layers can be precisely patterned. Therefore, it is possible to precisely and accurately control and form a nano-scaled wire grid polarizing pattern having uniform line widths and spaces an LCD substrate having a large area (i.e., greater than 600 mm×720 mm).

As described above, a thin film transistor substrate and a color filter substrate can be manufactured from a substrate having a large area with a wire grid polarizing pattern, and continuing with the manufacturing, a liquid crystal display panel composed of a thin film transistor substrate and a color filter substrate formed on a substrate having a wire grid polarizing pattern and a method of manufacturing them according to an embodiment as now described.

Figure 2:
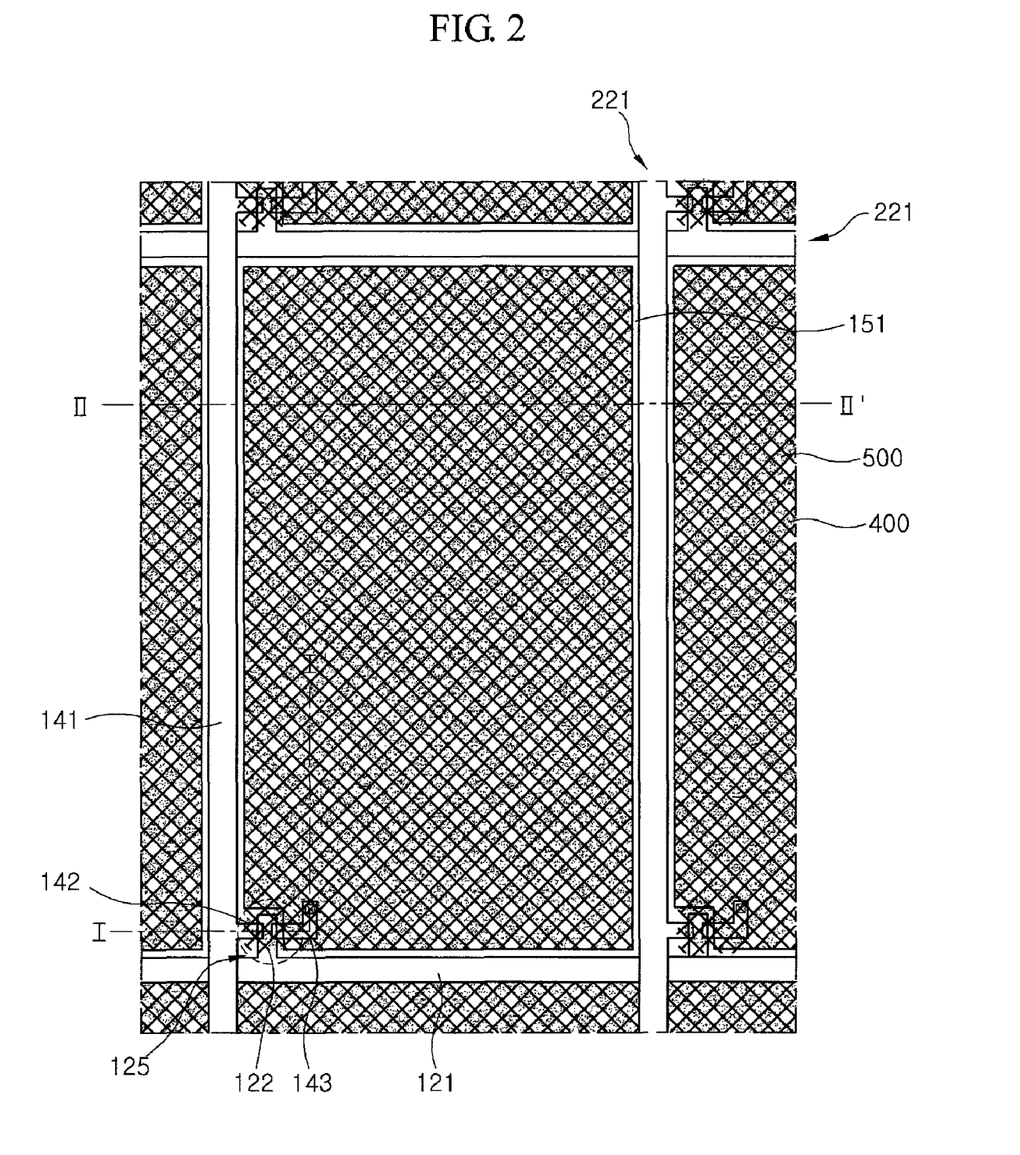
FIG. 2 is a plan view of a liquid crystal display formed of a substrate with a wire grid polarizing pattern through a nano imprint lithography process according to the present disclosure.
Figure 3:
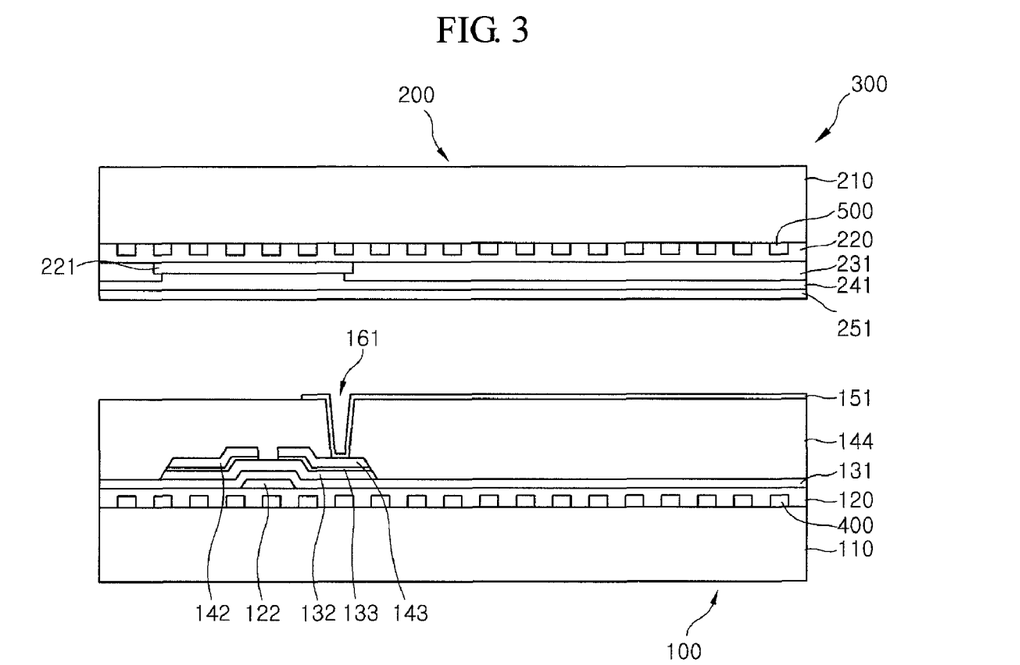
FIG. 3 is a cross-sectional view taken along the line I-I' of FIG. 2.

FIG. 2 is a plan view of a liquid crystal display panel with a wire grid polarizing pattern according to one embodiment. FIG. 3 is a cross-sectional view of the liquid crystal panel taken along the line I-I' of FIG. 2, and FIG. 4 is a cross-sectional view of the liquid crystal panel taken along the line II-II' of FIG. 2.

Figure 4:
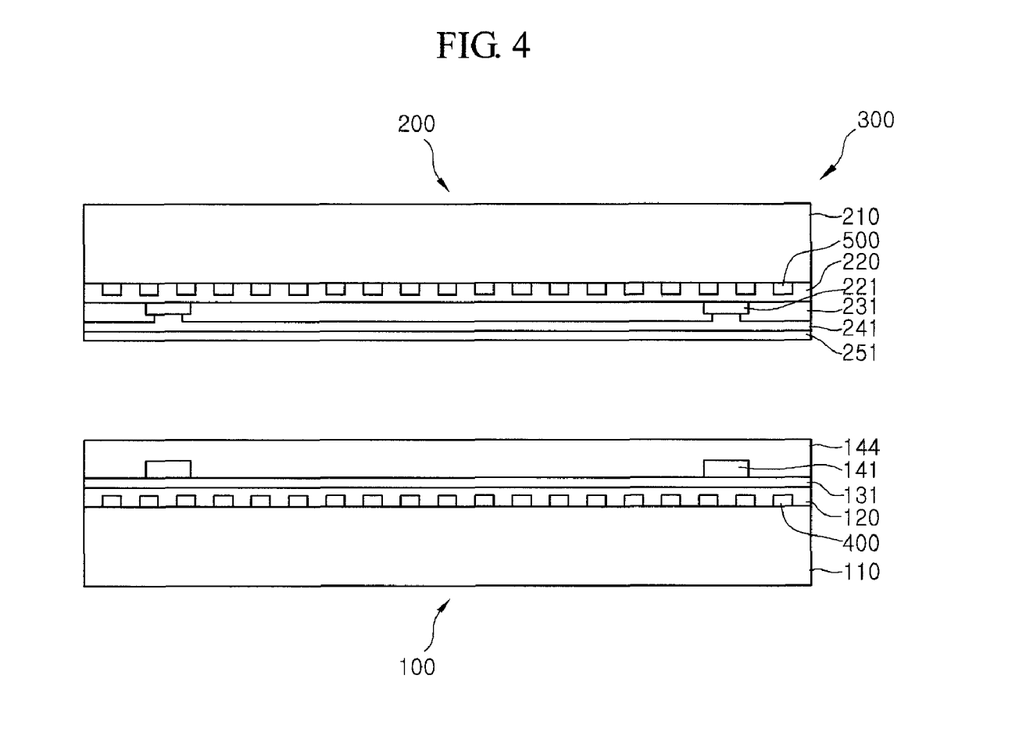
FIG. 4 is a cross-sectional view taken along the line II-II' of FIG. 2.

Referring to FIGS. 2 to 4, a liquid crystal display panel 300 includes a thin film transistor supporting substrate 100 and a color filter supporting substrate 200 that face each other and a liquid crystal layer (not shown) disposed between the substrates. Further, the liquid crystal display panel 300 further includes at least any one of a first wire grid polarizing pattern 400 formed in one direction over the entire upper surface of a first insulating substrate 110 of the thin film transistor substrate 100 and a second wire grid polarizing pattern 500 formed perpendicularly to the first wire grid polarizing pattern 400 over the entire upper surface of a second insulating substrate 210 of the color filter substrate 200.

The thin film transistor substrate 100 includes a plurality of gate lines 121 extending in one direction on the first insulating substrate 110, a plurality of data lines 141 crossing the gate lines 121, pixel electrodes 151 formed at pixel regions defined by the gate lines 121 and the data lines 141, and thin film transistors 125 connected to the gate lines 121, data lines 141, and pixel electrodes 151. The thin film transistor substrate 100 further includes the first wire grid polarizing pattern 400 with a predetermined width and space formed repeatedly in respective pixel regions in one direction.

The gate line 121 usually horizontally extends and forms gate electrodes 122 by protruding its parts up or down.

The data line 141 extends in one direction such that it perpendicularly crosses the gate line 121, and forms source electrodes 142 by protruding its parts. Drain electrodes 143 are formed at a predetermined space from the source electrodes 142 in forming the data lines 141.

The gate line 121 may be formed of a metal or an alloy thereof included the group having as its members: aluminum (Al), neodymium (Nd), argentum (silver, Ag), chrome (Cr), titanium (Ti), tantalum (Ta), and molybdenum (Mo). The gate line 121 may be formed not only as a single layer but also as a multilayer of a plurality of metallic layers. In other words, the gate line 121 may be formed into a bilayer including a metallic layer of chromium (Cr), titanium (Ti), tantalum (Ta) having superior physicochemical characteristics and an aluminum-based or silver-based metallic layer. Further, the data line 141 and source electrode 142, and the drain electrode 143 may be formed of the above metals into a multilayer.

The thin film transistor 125 responds to signals supplied to the gate line 121 and allows pixel signals supplied to the data line 141 to be applied to the pixel electrode 151 to charge it. Accordingly, the thin film transistor 125 includes the gate electrode 122 connected to the gate line 121, the source electrode 142 connected to the data line 141, the drain electrode 143 connected to the pixel electrode 151, a gate insulating film 131 and active film 132 sequentially formed between the gate electrode 122 and the source and drain electrodes 142 and 143, and an ohmic contact layer 133 formed at least a part of the active layer 132. The ohmic contact layer 133 may be formed on the active layer 132 except for channels.

A passivation film 144 is formed on the gate line 121, data line 141, and thin film transistors 125. The passivation film 144 may be formed of an inorganic substance, such as silicon nitride or silicon oxide, or an organic insulating film having low dielectric constant. The passivation film 144 may also be formed into a duplex film of inorganic and organic insulating films.

The pixel electrode 151 is formed at a pixel region defined by the gate line 121 and data line 141 on the substrate 110 and connected with the drain electrode 143.

The first wire grid pattern 400 is formed over the entire surface of the substrate 110 by the method described above in reference to FIGS. 1A to 1F, may be formed perpendicularly, parallel, or diagonally at a predetermined angle with respect to the gate line 121. The first wire grid polarizing pattern 400 may be formed by stamping individually in each respective pixel region.

Storage capacitor lines (not shown) may be formed to steadily maintain liquid crystal voltage applied to the liquid crystal layer (not shown) positioned between the thin film transistor supporting substrate 100 and the color filter supporting substrate 200. The storage capacitor line (not shown), for example, may be formed parallel with the gate line 121 in forming the gate line 121.

The color filter supporting substrate 200 further includes black matrixes 221, color filters 231, a planarizing overcoat film 241, and a common electrode 251. Further, the substrate 210 further includes the second wire grid polarizing pattern 500 over the entire upper surface. The second wire grid polarizing pattern 500 is preferably perpendicular to the first wire grid polarizing pattern 400.

The black matrixes 221 are formed at regions other than the pixel regions and are used to prevent light transmission through spaces between the pixel regions and provide light interruption between the adjacent pixel regions. The black matrix 221 has an opening that opens the region of the thin film transistor substrate 100, where the pixel electrode 151 is formed.

The color filters 231 are formed by repeatedly arranging red, green, and blue at regions defined by the boundaries of the black matrixes 221. The color filter 231 gives colors light irradiated from a light source and passing through the liquid crystal (not shown). The color filter 231 may be formed of a photosensitive organic material.

The overcoat film 241 is formed on the color filter 231 and parts of the black matrixes 221 that are not covered with the color filter 231. While planarizing the color filter 231, the overcoat film 241 also protects the color filter 231 and insulates an upper conductive layer from a lower conductive layer as well, and may be formed of an acrylic epoxy material.

The common electrode 251 is formed on the overcoat film 241. The common electrode 251 may be formed of a transparent conductive substance such as ITO (indium tin oxide) or IZO (indium zinc oxide). The common electrode 251 applies voltages across pixel regions of the liquid crystal layer (not shown) together with the pixel electrodes 151 of the thin film transistor supporting substrate.

The second wire grid polarizing pattern 500 is formed over the entire upper surface of the wide second substrate 210 by the method described above in reference to FIGS. 1A to 1F and preferably perpendicular to the first wire grid polarizing pattern 400. The second wire grid polarizing pattern 500 may be formed pixel regions only.

In the above embodiment, although the first wire grid polarizing pattern 400 is formed on the thin film transistor substrate 100 and the second wire grid polarizing pattern 500 is formed on the color filter substrate 200, it is not limited thereto and only one of the first and second wire grid polarizing patterns 400 and 500 may be so formed. Although not explicitly shown, in one embodiment a light modulating layer is formed on the lower sides of each of the thin transistor supporting substrate 100 and the color filters supporting substrate 200 to provide reorientation of light that fails to pass through the polarizing layers and thus reflects back from the wire grid polarizing patterns. The reoriented light may pass through the polarizing layers after being reoriented and reflected back again to re-enter them. The light modulating layer may be formed by attaching a film having a light orientation modulating layer or depositing a predetermined light modulating layer into a thin film shape. A passivation film may be attached to the lower surfaces of the thin film transistor substrate 100 and the color filter substrate 200 to protect the substrates.

As described above in reference to the disclosed embodiments, a wire grid polarizing pattern is integrally formed on at least any one of the thin film transistor supporting substrate and a color filter relative substrate or on both of said substrates. Because the wire grid polarizing pattern has a repeated structure in each pixel area, the corresponding polarizations and aperture ratios provided by the liquid crystal display panel are not reduced even though the wire grid polarizing pattern is formed individually by stamping at each pixel region of the thin film transistor substrate. Therefore, when light enters the wire grid polarizing patterns having a predetermined polarizing angle, horizontally oscillating light with respect to the wire grid polarizing patterns penetrates the space between the wire grid polarizing patterns. Perpendicularly entering light, however, can not penetrate due to the wire grid polarizing patterns, and is reflected back, reoriented by the modulating layer and then re-reflected from the light modulating layer under the substrate so as to thereafter re-enter the wire grid polarizing patterns for eventual passage therethrough. Because polarized light is induced on the entire by the repetitive light recycling described above, the aperture ratio is not reduced even thought wire grid polarizing patterns formed of reflective metallic substances are stamped at the individual pixel regions of the liquid crystal display panels.

Methods of forming the thin film transistor substrate 100 on the substrate 110 with the first wire grid polarizing pattern 400 and forming the color filter substrate 200 on the substrate 210 with the second wire grid polarizing pattern 500 according to the present disclosure are described hereafter.

FIGS. 5A to 5F are cross-sectional views illustrating sequential steps of a method of forming a thin film transistor supporting substrate on a substrate with the first wire grid polarizing pattern according to the present disclosure.

Figure 5A:
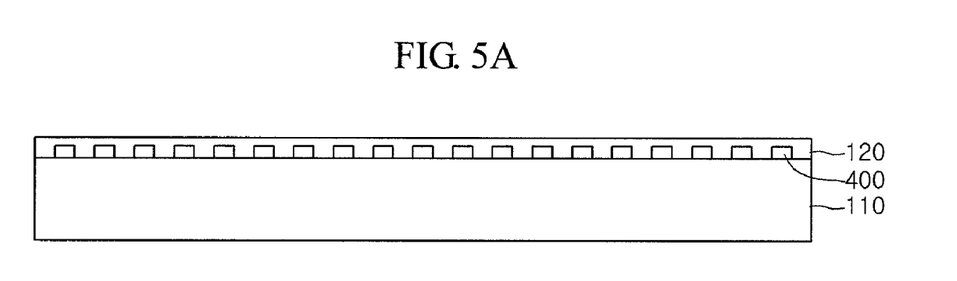
FIGS. 5A to 5F are cross-sectional views showing an element to sequentially illustrate a method of forming a thin film transistor substrate on a substrate with a wire grid polarizing pattern by a nano imprint lithography process according to an embodiment of the invention.

Referring to FIG. 5A, an insulating film 120 is formed on the substrate 110 with the first wire grid polarizing pattern 400 having a predetermined line width and space earlier formed thereon through the nano imprint lithography process described above. The first wire grid polarizing pattern 400, for example, is formed perpendicularly, parallel, or diagonally at a predetermined first angle with respect to the gate line 121. The insulating film 120, for example, is formed of a silicon oxide film.

Figure 5B:
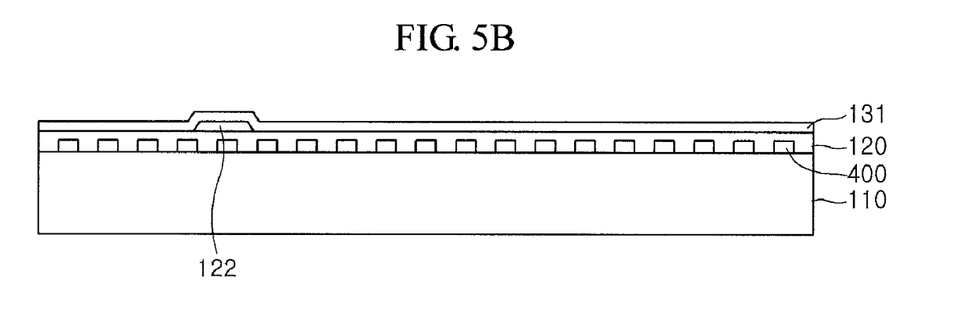

Referring to FIG. 5B, a first conductive layer is formed on the insulating film 120 and then patterned by a photo-etching process using a first mask. Gate electrodes 122 and gate lines 121 are formed through the above process. A gate insulating film 131 is formed over the entire insulating film 121. The gate insulating film 131 is formed of an inorganic insulating film including a silicon oxide film or a silicon nitride film.

Figure 5C:
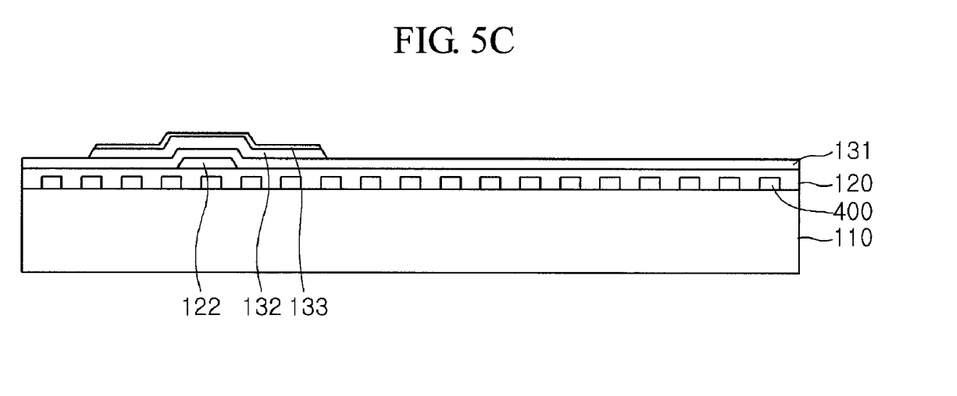

Referring to FIG. 5C, an active layer 132 and an ohmic contact layer 133 are sequentially formed over the entire gate insulating film 131. An amorphous silicon layer is used for the active layer 132 and an amorphous silicon layer doped with silicide or N-type impurities with high concentration is used for the ohmic contact layer 133. The active layer 132 and ohmic contact layer 133 are patterned by a photo-etching process using a second mask such that they overlap the gate electrodes 122.

Figure 5D:
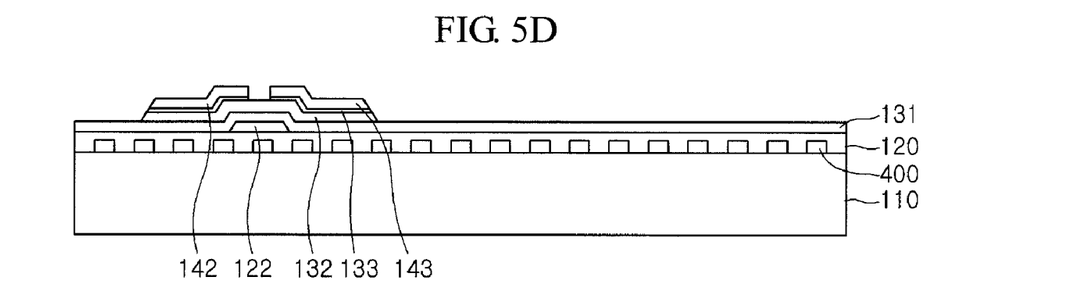

Referring to FIG. 5D, a second conductive layer is formed on the entire upper surface of the structure and patterned by a photo-etching process using a third mask, and data lines 141 including source electrodes 142 and drain electrodes 143 are formed accordingly. The source electrodes 142 and drain electrodes 143 are positioned at a predetermined space on the gate electrodes 122 and the channel regions are formed between them. The second conductive layer 2 is preferably formed into a single layer of a multilayer and may be formed of the same substance as the first conductive layer for forming the gate line 121.

Figure 5E:
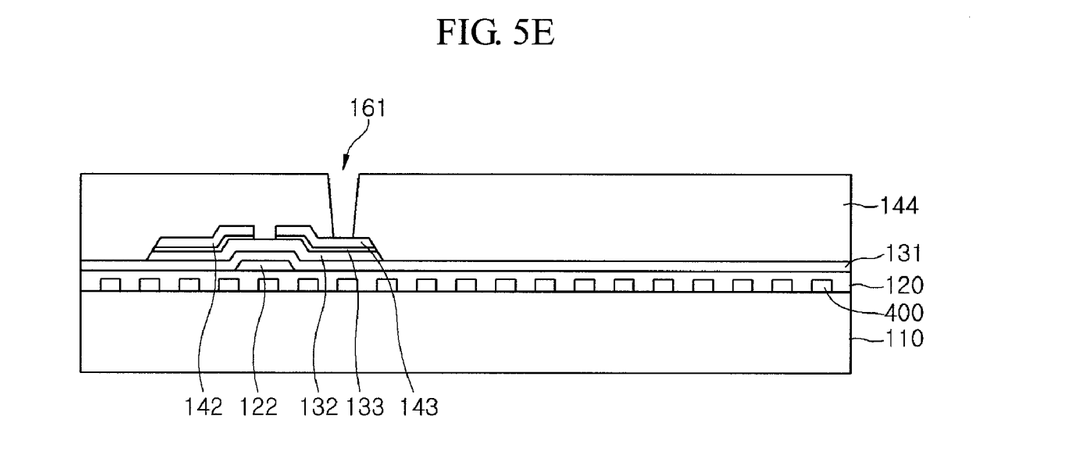

Referring to FIG. 5E, a passivation film 144 is formed on the entire upper surface of the structure. The passivation film 144 may be formed of an inorganic insulating film of a silicon oxide film or a silicon nitride film, or an organic insulating film of BCB (Benzocyclobutane) or acrylic resin, or formed by stacking the above layers. Contact holes 161 exposing the drain electrodes 143 are formed by etching predetermined regions of the passivation film 144 by a photo-etching process using the third mask.

Figure 5F:
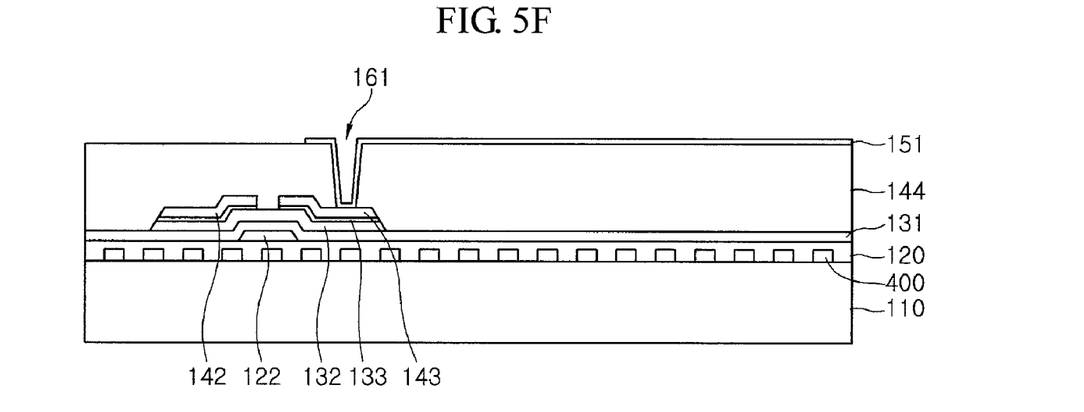

Referring to FIG. 5F, pixel electrodes 151 are formed on the passivation film 144 by forming a third conductive layer on the entire upper surface of the structure and then patterning the third conductive layer by a photo-etching process using a fourth mask. The fourth mask may be formed of a transparent conductive layer including ITO (Indium Tin Oxide) or IZO (Indium Zinc Oxide).

Figure 6A:
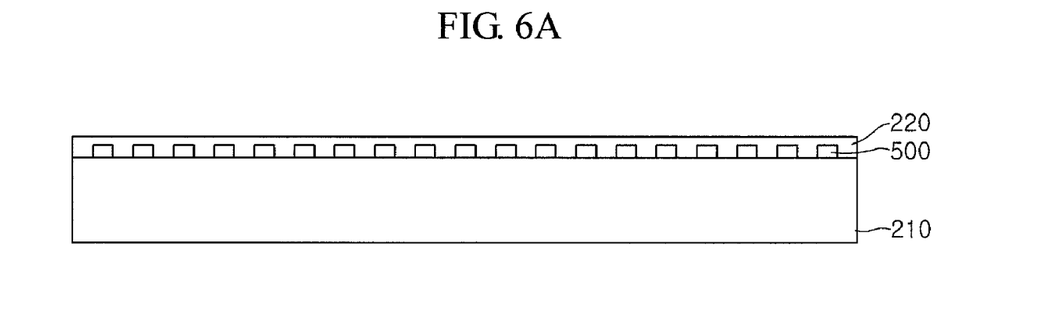
FIGS. 6A to 6C are cross-sectional views showing an element to sequentially illustrate a method of forming a color filter substrate on a substrate with wire grid polarizing pattern by a nano imprint lithography process according to an embodiment of the invention.
Figure 6B:
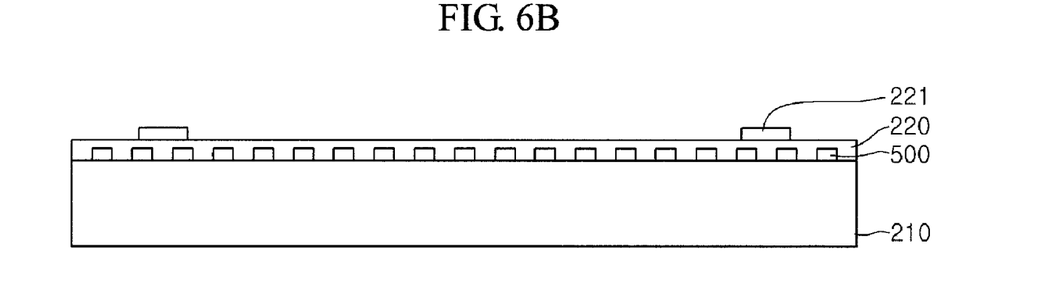
Figure 6C:
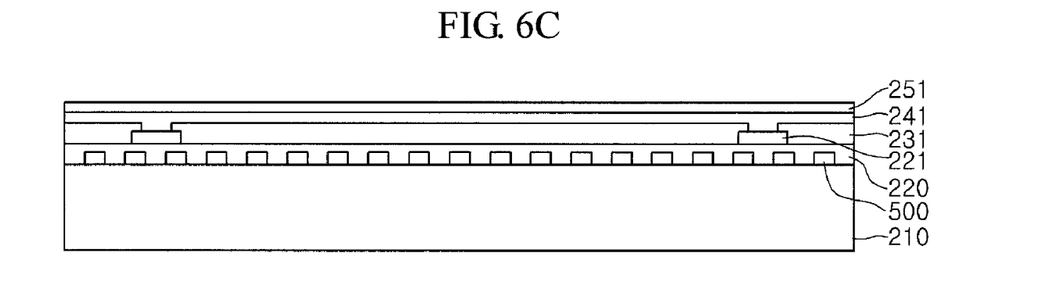

FIGS. 6A to 6C are cross-sectional views sequentially illustrating a method of forming a color filter substrate on a substrate with the second wire grid polarizing pattern according to an embodiment of the invention.

Referring to FIG. 6A, an insulating film 220 is formed on the substrate 210 with the second wire grid polarizing pattern 500 with a predetermined line width and space formed through nano imprint lithography process according to an embodiment of the invention. The second wire grid polarizing pattern 500 is preferably arranged perpendicular to the first wire grid polarizing pattern 400. The second wire grid polarizing pattern 500 is formed using a silicon oxide film.

Referring to FIG. 6B, black matrixes 221 are formed by forming a conductive layer over the entire upper surface of the substrate 210 with the second wire grid polarizing pattern 500 and the insulating film 220 and patterning the conductive layer by a photo-etching process using a predetermined mask. A second conductive layer for forming the black matrixes 221 includes chrome (Cr) or chrome oxide (CrO). Further, the black matrixes are formed at positions corresponding to the gate lines 121, the data lines 141, and the thin film transistors 125 of the thin film transistor substrate 100.

Referring to FIG. 6C, color filters 231 that are sequentially disposed between the black matrixes 221 are formed by sequentially arranging red, green, and blue transistors on the substrate 210 with the black matrixes 221 and patterning them. An overcoat film 241 is formed over the entire upper surface. The overcoat film 241 not only planarizes and protects the color filters 231, but also electrically insulates the black matrixes 221 from the common electrodes formed of conductive substances. Further, the overcoat film 241 is made of an acrylic epoxy material. The common electrode 251 is formed by forming a transparent conductive layer including ITO film or IZO film over the entire upper surface.

On the other hand, a liquid crystal display, in which the gate lines 121, data lines 141, and pixel electrodes 151 are formed on the thin film transistor substrate 100 and the black matrixes 221, color filters 231, and common electrode 251 are formed on the color filter substrate 200, was described in the above embodiments. The present disclosure of invention, however, is not limited to the disclosed embodiments and it is applicable to various liquid crystal cell structures and pixel shapes. For example, the process for forming integral polarizers may be applied to liquid crystal display panels having a variety of structures including when the black matrixes 221 are formed on the thin film transistor supporting substrate 100, or the color filters 231 are formed on the thin film transistor substrate 100.

As described above therefore, in forming wire grid polarizing patterns by a nano imprint lithography process, wire grid polarizing patterns are formed by bonding a stamp with different areas a substrate rather than the whole substrate at once. The substrate has a photosensitive film and the bonding is such that only recesses having a predetermined depth are formed in the photosensitive film, and then filled with an insulating mask material so that etching may follow using the insulating mask material as an etch mask for etching the reflective layer.

Therefore, since a margin of error from one stamping to the next can be increased when nano patterning the photosensitive film, a wire grid polarizing pattern with uniform line widths and spacings can be formed can be formed in each pixel area on a substrate having a large area for providing a large area liquid crystal panel.

What is claimed is:

1. A method of forming a polarizer, the method comprising:
    providing a substrate having a reflective layer formed over the substrate and a photo-hardenable film formed over the reflective layer;
    forming recesses having a predetermined widths and depths at predetermined regions in the photo-hardenable film;
    hardening the photo-hardenable film;
    filling the hardened recesses with an insulating material; and
    etching the photo-hardened film and the reflective layer by using the insulating material as an etch mask.

2. The method of claim 1, wherein the reflective layer is formed of a reflective substance including aluminum.

3. The method of claim 1, further comprising:
    forming an anti-reflective film between the reflective layer and the photo-hardenable film.

4. The method of claim 1, wherein the recesses are formed by bonding a stamp having a predetermined engraved pattern with the photo-hardenable film prior to hardening the photo-hardenable film.

5. The method of claim 1, wherein the recesses are formed to have a depth in the range of 10 to 50% in respect to the thickness of the photo-hardenable film.

6. The method of claim 1, wherein the insulating material filled in the recesses is formed by forming an insulating film on the entire upper surface to fill the recesses and applying a blanket etch back over the entire insulating film to thereby expose portions of the photo-hardened film that were not recessed.

7. The method of claim 1, wherein the photo-hardened film is removed by oxygen plasma.

8. The method of claim 1, the reflective layer is etched by mixed plasma of $BCl_3$, $Cl_2$, $SF_6$, and $O_2$.

* * * * *